(12) United States Patent
Funakoshi et al.

(10) Patent No.: US 11,035,494 B2
(45) Date of Patent: Jun. 15, 2021

(54) FLOW RATE CONTROL APPARATUS AND FLOW RATE CONTROL METHOD FOR THE FLOW RATE CONTROL APPARATUS

(71) Applicant: FUJIKIN INCORPORATED, Osaka (JP)

(72) Inventors: Takashi Funakoshi, Osaka (JP); Yoshinori Shimomura, Osaka (JP); Tsuyoshi Tanikawa, Osaka (JP); Tadayuki Yakushijin, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/495,931

(22) PCT Filed: Jun. 21, 2018

(86) PCT No.: PCT/JP2018/023632
§ 371 (c)(1),
(2) Date: Sep. 20, 2019

(87) PCT Pub. No.: WO2018/235900
PCT Pub. Date: Dec. 27, 2018

(65) Prior Publication Data
US 2020/0132216 A1 Apr. 30, 2020

(30) Foreign Application Priority Data
Jun. 22, 2017 (JP) .............................. JP2017-122371

(51) Int. Cl.
*F16K 37/00* (2006.01)
*F16K 43/00* (2006.01)

(52) U.S. Cl.
CPC .............. *F16K 37/00* (2013.01); *F16K 43/00* (2013.01)

(58) Field of Classification Search
CPC ................................. F16K 37/00; F16K 43/00
See application file for complete search history.

(56) References Cited

U.S. PATENT DOCUMENTS

| 5,404,902 A | 4/1995 | Wen | |
| 6,263,896 B1 * | 7/2001 | Williams | .................. F16K 7/10 |
| | | | 137/15.15 |

(Continued)

FOREIGN PATENT DOCUMENTS

| CN | 1959928 A | 5/2007 |
| EP | 3540280 A1 | 9/2019 |

(Continued)

OTHER PUBLICATIONS

International Search Report dated Sep. 25, 2018, issued for PCT/JP2018/023632.

(Continued)

*Primary Examiner* — Kevin R Barss
(74) *Attorney, Agent, or Firm* — Locke Lord LLP

(57) ABSTRACT

Provided is a flow rate control apparatus capable of being used continuously when the apparatus is used in equipment that operates continuously, and a flow rate control method for the flow rate control apparatus. A flow rate of a fluid is controlled via any one of control valves disposed in branch passages, respectively. When replacement of the one control valve is determined to be necessary on the basis of a signal outputted from a monitoring portion of the one control valve, the one control valve performing flow rate control is closed, and another control valve disposed in another one of the branch passages, is opened, to perform flow rate control with a flow rate equivalent to that before the replacement. Furthermore, on-off valves disposed at upstream and downstream sides of the closed control valve are closed.

10 Claims, 5 Drawing Sheets

(56) References Cited

U.S. PATENT DOCUMENTS

| | | | | |
|---|---|---|---|---|
| 10,801,643 B2* | 10/2020 | Mueller | ............. | F16K 37/0041 |
| 2014/0261740 A1* | 9/2014 | Bush | ........................ | E03D 1/34 |
| | | | | 137/15.08 |
| 2018/0112788 A1 | 4/2018 | Ishibashi et al. | | |
| 2019/0107463 A1* | 4/2019 | Suga | ....................... | F16K 37/00 |
| 2020/0032923 A1* | 1/2020 | Sun | ...................... | F16K 43/001 |

FOREIGN PATENT DOCUMENTS

| | | | |
|---|---|---|---|
| GB | 2293006 | A | 3/1996 |
| JP | H05-189055 | A | 7/1993 |
| JP | H07-198099 | A | 8/1995 |
| JP | H08-101719 | A | 4/1996 |
| JP | 2016-205409 | A | 12/2016 |
| JP | 2017-015167 | A | 1/2017 |
| WO | 2018/088326 | A1 | 5/2018 |

OTHER PUBLICATIONS

Office Action dated Aug. 3, 2020 and Search Report issued for the Chinese Patent Application No. 201880021913.8 together with English translation of the Office Action.

Office Action dated Aug. 25, 2020, issued for the corresponding KR patent application No. 10-2019-7028773 and English translation thereof.

\* cited by examiner

FLOW RATE CONTROL APPARATUS AND FLOW RATE CONTROL METHOD FOR THE FLOW RATE CONTROL APPARATUS

TECHNICAL FIELD

The present invention relates to a flow rate control apparatus and a flow rate control method for the flow rate control apparatus.

BACKGROUND ART

In semiconductor manufacturing equipment, a flow rate control apparatus provided with a control valve is typically used (for example, Patent Literature 1, Patent Literature 2, etc.).

When the control valve used in such a flow rate control apparatus breaks down, there arises a serious problem in semiconductor manufacturing. Therefore, in order to avoid such a situation, for example, the number of operating times of the control valve is counted, and the control valve is scheduled to be replaced before the breakdown of the control valve, so as not to adversely affect the semiconductor manufacturing.

CITATION LIST

Patent Literature

Patent Literature 1: Japanese Unexamined Patent Application Publication JP-A-2017-15167
Patent Literature 2: International Patent Application Publication WO 2018/088326

SUMMARY OF INVENTION

Technical Problem

However, the timing of breakdown of the control valve cannot be accurately predicted. In addition, even if the control valve is to be replaced at predetermined timing, the replacement requires interruption of the semiconductor manufacturing, which causes a problem that continuous manufacturing cannot be performed. The flow rate control apparatus to be used, not only in the semiconductor manufacturing equipment, but also in equipment that is operating continuously, requires that the apparatus can be used continuously.

An object of the present invention is to provide: a flow rate control apparatus capable of being used continuously when the apparatus is used in equipment that operates continuously; and a flow rate control method for the flow rate control apparatus.

Solution to Problem

The flow rate control apparatus in accordance with the present invention is a flow rate control apparatus including: one flow passage; branch portions at which the flow passage branches into a plurality of branch passages; control valves disposed in the respective branch passages into which the flow passage branches at the branch portions; and a monitoring portion configured to monitor a state of a corresponding one of the control valves, wherein a flow rate of a fluid is controlled via any one of the control valves disposed in the respective branch passages, and when replacement of the one control valve is determined to be necessary on a basis of a signal outputted from the monitoring portion of the one control valve, the one control valve, which is performing flow rate control, is closed, and another one of the control valves, which is disposed in another one of the branch passages, is opened, so as to perform flow rate control such that the flow rate is equivalent to that before the replacement, and on-off valves disposed at an upstream side and a downstream side of the closed control valve are also closed.

The flow rate control apparatus is used in equipment, such as semiconductor manufacturing equipment, which operates continuously. A required amount of a fluid is sent to the equipment via one of the control valves. When there arises a need to replace the one control valve that is operating, another one of the control valves, which is in a standby state, is shifted into an operating state, so as to perform flow rate control such that the flow rate is equivalent to that before the replacement. At this time, the on-off valves disposed at the upstream side and the downstream side of the closed control valve are closed automatically, thereby preventing fluid leakage during the transition. This enables the flow rate control apparatus to be used continuously.

For example, the control valve includes: a valve body defining a flow passage; a valve element disposed so as to be capable of opening/closing the flow passage in the valve body; an operation member configured to operate the valve element movably disposed between at a closed position that is previously set to cause the valve element to close the flow passage and at an open position that is previously set to cause the valve element to open the flow passage, in opening/closing directions in which the flow passage is opened/closed by the valve element; a main actuator configured to move the operation member to the open position or the closed position; and an adjustment actuator (adjustment portion) configured to adjust the position of the operation member that is positioned at the open position.

Preferably, the following configuration may be adopted: the main actuator moves the operation member to the open position; and the adjustment actuator adjusts the position, in the opening/closing directions, of the operation member that is positioned at the open position by the main actuator.

It is preferable that the flow rate control apparatus further includes a control unit, and that the control unit receives an output from the monitoring portion, and determines whether or not the replacement is necessary from the signal outputted from the monitoring portion.

It is preferable that the control unit compares the signal outputted from the monitoring portion and previously stored data, and determines that the replacement is necessary, when the signal exceeds a predetermined value (threshold value) at which the control valve is determined to be within a range of a normal state or the signal is below the predetermined value (threshold value), or the signal exceeds a predetermined number of opening/closing times.

It is preferable that each of the control valves is equipped with an adjustment portion capable of performing fine flow rate control by making fine adjustment of its opening degree.

The monitoring portion includes: a valve opening-degree measurement sensor or a flow rate sensor; an opening/closing number of times measurement sensor; a proximity sensor, a displacement sensor, a flow rate sensor or a pressure sensor each configured to detect movement of a stem of the control valve; and the like.

It is preferable that a purge line and a purge valve in the purge line are disposed between each of the control valves and the corresponding on-off valve disposed at the upstream side, and another purge line and another purge valve in the another purge line are disposed between the control valve and the corresponding on-off valve disposed at the downstream side.

The on-off valves corresponding to the control valve that is performing flow rate control are caused to be open, whereby the operating state of the control valve is maintained, and the purge valves corresponding to the control valve that is performing flow rate control are caused to be closed. When the replacement of this control valve becomes necessary, the on-off valves corresponding to this control valve are caused to be closed, the purge valves are switched to be open before the replacement so as to be connected to the respective purge lines, and another control valve is caused to be in an operating state. The replacement is thus performed safely and readily.

The flow rate control method in accordance with the present invention is a flow rate control method for a flow rate control apparatus, the flow rate control apparatus including one flow passage, branch portions at which the flow passage branches into a plurality of branch passages, control valves disposed in the respective branch passages into which the flow passage branches at the branch portions, and a monitoring portion configured to monitor a state of a corresponding one of the control valves, and the flow rate control method including: a step A of monitoring a state of any one of the control valves, which is performing flow rate control, by the corresponding monitoring portion; a step B of determining whether or not valve replacement is necessary from a signal outputted from the monitoring portion; a step C of, in a case where the replacement is determined to be necessary in the step B, closing the one control valve that is performing flow rate control, and opening another one of the control valves, which is disposed at another one of the branch passages, so as to start flow rate control such that the flow rate is equivalent to that before the replacement; and a step D of closing on-off valves disposed at an upstream side and a downstream side of the closed control valve.

It is preferable that each of the control valves is equipped with an adjustment portion configured to make fine adjustment of opening/closing movements of the control valve, and the step C includes a step of performing adjustment of the opening/closing movements, by the adjustment portion, so as to eliminate a difference between the another control valve that has started flow rate adjustment and the one control valve that is closed, and eliminate an individual difference between branch passages.

Advantageous Effects of Invention

With the flow rate control apparatus in accordance with the present invention, even when there arises a need to replace one of the control valves, which is operating, the flow rate control apparatus can be used continuously, because another control valve that has been in a standby state can be shifted into an operating state, without interrupting the operation of the flow rate control apparatus. Therefore, equipment that uses the flow rate control apparatus can continue its operation without being affected by the abnormality of the control valve.

REFERENCE SIGNS LIST

Figure 1:
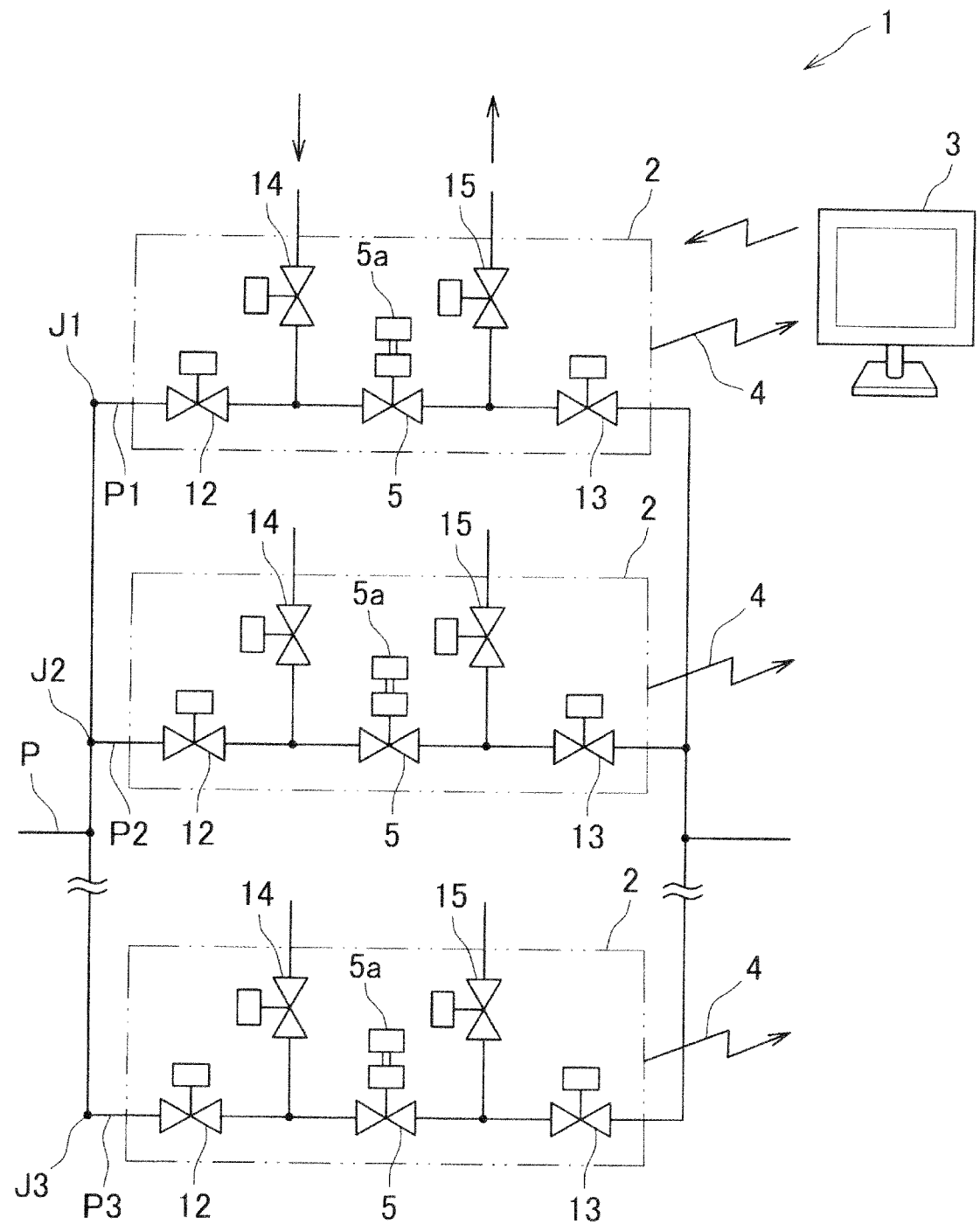
FIG. 1 is a piping diagram showing a flow rate control apparatus and a flow rate control method for the flow rate control apparatus in accordance with one embodiment of the present invention.

1: flow rate control apparatus
2: valve unit
3: control unit
5: control valve
5a: monitoring portion
12, 13: on-off valve
14, 15: purge valve
100: adjustment actuator (adjustment portion)
P: flow passage
P1, P2, P3: branch passage
J1, J2, J3: branch portion

DESCRIPTION OF EMBODIMENTS

The embodiments of the present invention will be described below with reference to the accompanying drawings.

As shown in FIG. 1, a flow rate control apparatus 1 in accordance with the present invention includes: one flow passage P; branch portions J1, J2, J3 at which the flow passage P branches into a plurality of branch passages P1, P2, P3; valve units 2 disposed in the respective branch passages P1, P2, P3 into which the flow passage P branches at the branch portions J1, J2, J3; and a control unit 3 configured to control a state of each of the valve units 2.

Each valve unit 2 includes: a control valve 5 having the function of controlling a flow rate when a fluid is sent to an apparatus disposed at a downstream side of the flow rate control apparatus 1; two on-off valves 12, 13 that are caused to be open or closed when the control valve 5 is replaced; and purge valves 14, 15 that are opened/closed in order to conduct a purge when the control valve 5 is replaced.

Each valve 11, 12, 13, 14, 15 is an automatic valve having a required sensor that is built therein. The state of each of the valves 11, 12, 13, 14, 15 of each of all the valve units 2 is monitored by the control unit 3 that is implemented by a personal computer, or the like.

Each valve unit 2 is provided with a wireless transmission/reception device 4. Data from each valve 11, 12, 13, 14, 15 are transmitted to the control unit 3 via the wireless transmission/reception device 4. The control unit 3 processes the data, and transmits any required signal to each valve 11, 12, 13, 14, 15 of each corresponding valve unit 2 via the corresponding wireless transmission/reception device 4. Although the transmission and reception between each of the valve units 2 and the control unit 3 are conducted wirelessly using the corresponding wireless transmission/reception device 4, they may be conducted through wire.

Although any appropriate number of valve units 2 may be used, at least two valve units are necessary. This is because, while one of the two valve units is used, a control valve, which requires replacement, included in the other of the valve units can be replaced with a new one, whereby the other valve unit becomes available (in a standby state).

The control valve 5 is called a direct touch metal diaphragm valve, which uses a metal diaphragm as a valve element, and includes a monitoring portion 5a for monitoring the state of the control valve 5.

Although not shown in detail, the monitoring portion 5a includes: a control-valve 5 opening-degree measurement sensor or a flow rate sensor; an opening/closing number of times measurement sensor; a proximity sensor, a displacement sensor, a flow rate sensor or a pressure sensor each configured to detect movement of a stem of the control valve; and the like.

The on-off valves 12, 13 consist of: a first on-off valve 12 that is disposed at an upstream side of the control valve 5 and is configured to prevent the fluid from flowing into the control valve 5; and a second on-off valve 13 that is disposed at a downstream side of the control valve 5 and is configured to prevent the fluid from flowing out from the control valve 5.

The purge valves 14, 15 consist of: a first purge valve 14 disposed in a passage into which a connection passage between the control valve 5 and the first on-off valve 12 branches; and a second purge valve 15 disposed in a passage into which a connection passage between the control valve 5 and the second on-off valve 13 branches.

Figure 2:
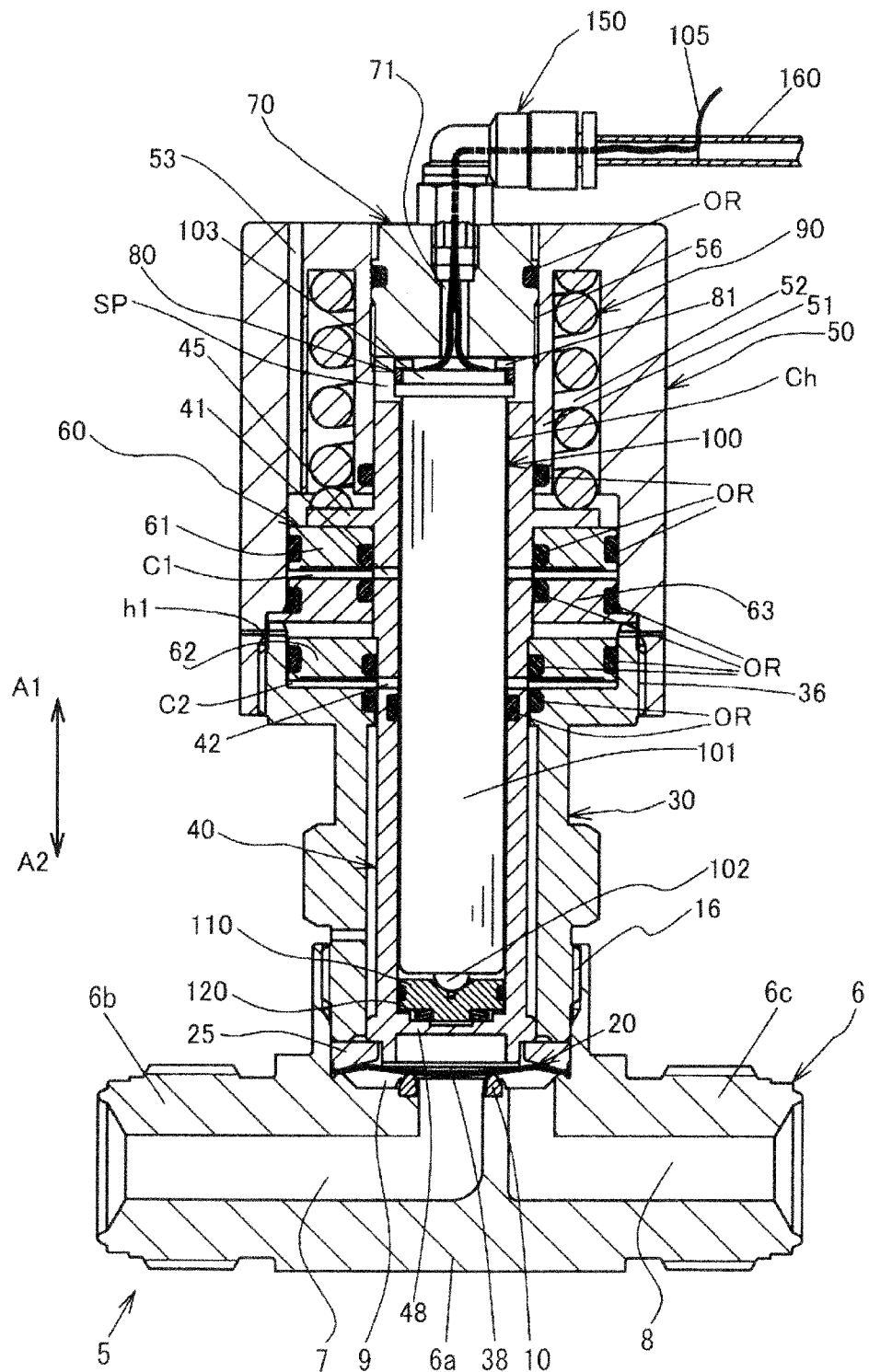
FIG. 2 is a longitudinal sectional view showing an example of a control valve to be used in the flow rate control apparatus in accordance with the present invention.

FIG. 2 shows an example of the control valve 5.

In FIG. 2, the following reference signs denote components as described below, respectively: 5 denotes the control valve; 6 denotes a valve body; 20 denotes a diaphragm as a valve element; 38 denotes a diaphragm presser; 30 denotes a bonnet; 40 denotes an operation member; 50 denotes a casing; 60 denotes a main actuator; 70 denotes an adjustment body; 80 denotes an actuator presser; 90 denotes a coil spring; 100 denotes a piezoelectric actuator as an adjustment actuator (adjustment portion); 110 denotes an actuator receiver; 120 denotes a coned-disc spring as an elastic member; and OR denotes an O-ring as a seal member.

The valve body 6, formed of stainless steel, has: a block-shaped valve body main body 6a; and connection portions 6b, 6c each projecting from each side of the valve body main body 6a, and defines flow passages 7, 8. The flow passage 7 has: one end that is open at an end surface of the connection portion 6b; and the other end that is in communication with a U-shaped valve chamber 9 that is open upward. Likewise, the flow passage 8 has: one end that is open at an end surface of the connection portion 6c; and the other end that is in communication with the U-shaped valve chamber 9 that is open upward. On a bottom surface of the valve chamber 9, a valve seat 10 made of a synthetic resin (PFA, PA, PI, PCTFE, etc.) is fitted into and fixed to a mounting groove that is disposed on a peripheral edge of an opening of the other end side of the flow passage 7. In the present embodiment, the valve seat 10 is fixed in the mounting groove by caulking.

The diaphragm 20 is a valve element provided so as to open/close the flow passages 7, 8 of the valve body 6, and is disposed above the valve seat 10. The diaphragm 20 holds the airtightness of the valve chamber 9, and the center portion of the diaphragm 20 moves up and down to be separated from and coming into contact with the valve seat 10, respectively, whereby the flow passages 7, 8 are opened and closed. In the present embodiment, the diaphragm 20 is designed to have the shape of a spherical shell, with a circular arc portion bulging upward in a natural state. Such a diaphragm 20 is manufactured by bulging a center portion of sheet metal, such as special stainless steel, and a sheet alloy of nickel and cobalt in an upward direction. The diaphragm 20 is composed of: three sheets of the special stainless steel; and one sheet of the nickel and cobalt alloy, which are layered on one another.

The diaphragm 20 has a peripheral edge portion that is placed on a protruding portion on an inner peripheral surface of the valve chamber 9. The bonnet 30 has a lower end portion that is inserted into the valve chamber 9. The lower end portion is screwed on a screw portion 16 of the valve body 6, whereby the diaphragm 20 is pressed against the valve body 6, toward the side of the protruding portion, via a press adaptor 25 made of a stainless alloy, such that the diaphragm 20 is sandwiched and fixed in an airtight state. It should be noted that the nickel-cobalt alloy thin film is disposed on a gas contact side.

The operation member 40 is a member for operating the diaphragm 20 so as to cause the diaphragm 20 to open and close the flow passages 7, 8. The operation member 40 is formed into a substantially cylindrical shape, with a lower end side thereof being closed by a closed portion 48 and an upper end side thereof being open. The operation member 40 is fitted to an inner peripheral surface of the bonnet 30 and to an inner peripheral surface of a hollow cylinder portion 51 formed inside the casing 50, and is supported so as to be movable in a vertical direction. It should be noted that reference signs A1, A2 shown in FIG. 2 denote opening and closing directions of the operation member 40, with A1 representing the opening direction and A2 representing the closing direction. In the present embodiment, the opening direction A1 indicates an upward direction with respect to the valve body 6 and the closing direction A2 indicates a downward direction with respect to the valve body 6. However, in actual use, the directions indicated by A1 and A2 are not limited to the above-described directions.

On a lower end surface of the operation member 40, the diaphragm presser 38 made of a synthetic resin, such as a polyimide resin, is fitted, which is in contact with an upper surface of the center portion of the diaphragm 20.

Between an upper surface of a flange portion 45 formed on an outer peripheral surface of the operation member 40 and a ceiling surface of the casing, the coil spring 90 is disposed. The operation member 40 is normally urged toward the closing direction A2 by the coil spring 90. Therefore, as shown in FIG. 2, in a state where the main actuator 60 is not in operation, the diaphragm 20 is pressed against the valve seat 10 thereby closing between the flow passage 7 and the flow passage 8.

The coil spring 90 is accommodated in a holding portion 52 formed between an inner peripheral surface of the casing 50 and the hollow cylinder portion 51. Although the coil spring 90 is used in the present embodiment, the type of the spring to be used is not limited thereto, and other types of springs, such as a coned-disc spring and a plate spring, may be used.

The casing 50 has an inner periphery at a lower end portion thereof, which is screwed on a screw portion 36 formed on an outer periphery of an upper end portion of the bonnet 30, whereby the casing 50 is fixed to the bonnet 30. It should be noted that, between an upper end surface of the bonnet 30 and the casing 50, an annular bulkhead 63 is fixed.

Between the outer peripheral surface of the operation member 40, and the casing 50 and the bonnet 30, cylinder chambers C1, C2 that are vertically partitioned by the bulkhead 63 are formed.

In the upper cylinder chamber C1, a piston 61 that is formed into an annular shape is fitted to be inserted. In the lower cylinder chamber C2, a piston 62 that is formed into an annular shape is fitted to be inserted. These cylinder chambers C1, C2 and pistons 61, 62 constitute the main actuator 60 configured to move the operation member 40 in the opening direction A1. The main actuator 60 is designed to be capable of boosting a force obtained by an operation gas, by increasing an area on which a pressure is acting with use of these two pistons 61, 62.

A space above the piston 61 in the cylinder chamber C1 is in communication with an atmosphere via a ventilation passage 53. A space above the piston 62 in the cylinder chamber C2 is in communication with an atmosphere via a ventilation passage h1.

Because a high-pressure operation gas is supplied into spaces below the pistons 61, 62 in the cylinder chambers C1, C2, the airtightness in the spaces is maintained by O-rings OR. These spaces are in communication with respective flow channels 41, 42 formed in the operation member 40. The flow channels 41, 42 are in communication with a flow channel Ch that is formed between an inner peripheral surface of the operation member 40 and an outer peripheral surface of a case body 101 of the piezoelectric actuator 100. The flow channel Ch is in communication with a space SP formed by an upper end surface of the operation member 40, the hollow cylinder portion 51 of the casing 50, and a lower end surface of the adjustment body 70. A flow channel 81 formed in the annular actuator presser 80 connects the space SP and a flow channel 71 penetrating a center portion of the adjustment body 70. The flow channel 71 of the adjustment body 70 is in communication with a pipe 160 via a pipe joint 150.

The piezoelectric actuator 100 has a built-in piezoelectric elements layered in the cylindrical case body 101, which is not shown. The case body 101 is made of metal, such as a stainless alloy. An end surface on the side of a leading end portion 102 of the case body 101, which is semi-spherically shaped, and an end surface on the side of a base end portion 103 of the case body 101 are both closed. By applying voltage across the layered piezoelectric elements to be elongated, the end surface on the side of the leading end portion 102 of the case body 101 elastically deforms, which causes a displacement of the semi-spherically-shaped leading end portion 102 in the longitudinal direction. When a maximum stroke of the layered piezoelectric elements is defined as $2d$, by applying a predetermined voltage $V0$ at which the elongation of the piezoelectric actuator 100 is d in advance, the entire length of the piezoelectric actuator 100 becomes L0. When a higher voltage than the predetermined voltage V0 is applied, the entire length of the piezoelectric actuator 100 becomes L0+d at the maximum. When a lower voltage than the predetermined voltage V0 is applied (a case of no-voltage being applied is included), the entire length of the piezoelectric actuator 100 becomes L0−d at the minimum. Therefore, the entire length from the leading end portion 102 to the base end portion 103 may elongate and contract along the opening/closing direction A1, A2.

As shown in FIG. 2, power is supplied to the piezoelectric actuator 100 via wiring 105. The wiring 105 is guided into the pipe 160 via the flow channel 71 of the adjustment body 70 and the pipe joint 150, and is drawn to the outside at a middle portion of the pipe 160.

The position of the base end portion 103 of the piezoelectric actuator 100 in the opening/closing direction is determined by the lower end surface of the adjustment body 70 via the actuator presser 80. A screw portion formed on an outer peripheral surface of the adjustment body 70 is screwed into a screw hole 56 formed at an upper portion of the casing 50, and by adjusting the position of the adjustment body 70 in the opening/closing direction A1, A2, the position of the piezoelectric actuator 100 in the opening/closing direction A1, A2 may be adjusted.

The leading end portion 102 of the piezoelectric actuator 100 is in contact with a receiving surface that is formed on an upper surface of the disc-shaped actuator receiver 110 and has the shape of a conical face. The actuator receiver 110 is movable in the opening/closing direction A1, A2.

The coned-disc spring 120 as an elastic member is disposed between a lower surface of the actuator receiver 110 and an upper surface of the closed portion 48 of the operation member 40. In a state shown in FIG. 2, the coned-disc spring 120 has already been contracted to some degree to be elastically deformed, and the actuator receiver 110 is normally urged in the opening direction A1 due to a restoring force of the coned-disc spring 120. Thus, the piezoelectric actuator 100 is also normally urged in the opening direction A1, and an upper surface of the base end portion 103 is in a pressed state against the actuator presser 80. This causes the piezoelectric actuator 100 to be disposed at a predetermined position with respect to the valve body 6. Because the piezoelectric actuator 100 is not connected to any member, it is movable relative to the operation member 40 in the opening/closing direction A1, A2.

The control valve 5 is used in, for example, semiconductor manufacturing equipment of which continuous production is required. The control valve 5 used for this purpose is required to be opened and closed continuously, and in order to replace the diaphragm 20 before being damaged, the number of opening/closing times of the control valve 5, at which the diaphragm 20 results in breakage, is set in advance. In addition, because durability is important, measures to improve durability are adopted by using a high strength material for the diaphragm or by reducing a valve lift. However, in a case where, for example, a greater flow rate is required on the semiconductor manufacturing equipment side, and the like, measures to increase the valve lift, or the like, while sacrificing durability are taken in some cases. In such a case, there is a possibility that the control valve breaks down before the valve is opened/closed at a set number of times. This ends up adversely affecting continuous production by the semiconductor manufacturing equipment, to a great degree.

The flow rate control apparatus 1 adjusts the flow rate of a fluid as required, via the control valves 5, and sends the fluid to, for example, semiconductor manufacturing equipment. At this time, only one of all the valve units 2 is in an operating state, while other valve units 2 are in a standby state in which they can immediately shift to an operating state as required. When the control valve 5 of the valve unit 2 that is in the operating state breaks down, or when the control valve 5 is opened/closed more times than an ensured number of times, which is predetermined to ensure durability, the monitoring portion 5a detects to that effect and causes the control valve 5 to stop its operation, while the control valve 5 of the valve unit 2 in the standby state is caused to start its operation.

The on-off valves 12, 13 are open when the control valve 5 is in the operating state, and are closed when the control valve 5 is in the standby state. The purge valves 14, 15 are normally closed, and are opened in order to conduct a purge for the corresponding valve unit 2 when the operating state is interrupted.

Figure 3:
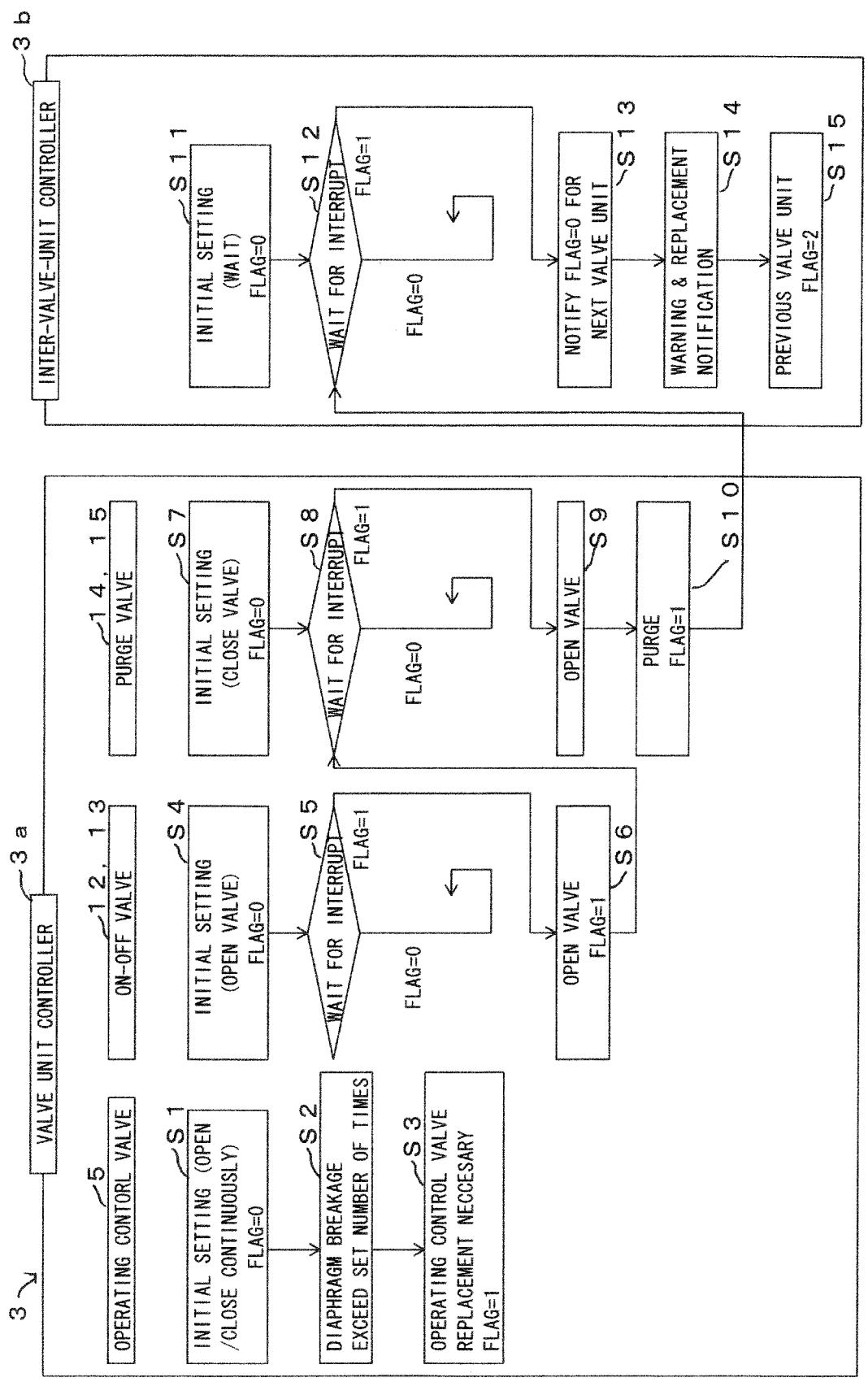
FIG. 3 is a flowchart showing the flow rate control method for the flow rate control apparatus in accordance with the present invention.

FIG. 3 is a flowchart showing how the control unit 3 performs control.

The control unit 3 includes: a valve unit controller 3a that performs control within each valve unit 2; and an inter-valve-unit controller 3b that performs control between the valve units 2.

The valve unit controller 3a gives, with respect to the control valve 5: FLAG=0 signifying that the control valve 5 is opened/closed continuously, at the time of the initial setting (step S1); and, for example, in a case where the number of times at which the control valve 5 is opened/closed exceeds a set number of times at which the possibility of breakage of the diaphragm 20 becomes high (step S2), FLAG=1 signifying that replacement of the control valve 5 is necessary (step S3).

It is considered that FLAG=1 is given, not only according to the number of the opening/closing times, but also when the operating time of the control valve 5 exceeds a set time or according to the occurrence of abnormality of the diaphragm 20, and the like, detected by the monitoring portion 5a provided to the control valve 5.

In addition, the valve unit controller 3a gives, with respect to the on-off valves 12, 13, FLAG=0 signifying that the on-off valves 12, 13 are opened, at the time of the initial setting (step S4), and monitors whether the FLAG with respect to the control valve 5 is 0 or 1, as waiting for interrupt (step S5). While the control valve 5 is FLAG=0, the open state of the on-off valves 12, 13 is maintained, and when the control valve 5 becomes FLAG=1, FLAG=1 signifying that the on-off valves 12, 13 are closed is given (step S6).

Furthermore, the valve unit controller 3a gives, with respect to the purge valves 14, 15, FLAG=0 signifying that the purge valves 14, 15 are closed, at the time of the initial setting (step S7), and monitors whether the FLAG with respect to the on-off valves 12, 13 is 0 or 1, as waiting for interrupt (step S8). While the on-off valves 12, 13 are FLAG=0 (that is, while the control valve 5 is FLAG=0), the closed state of the purge valves 14, 15 is maintained, and when the on-off valves 12, 13 become FLAG=1, the purge valves 14, 15 are opened (step S9), and FLAG=1 signifying a purge is conducted is given (step S10).

The inter-valve-unit controller 3b gives, with respect to the valve unit 2 that is in a standby state, FLAG=0 signifying that the valve unit 2 is in a standby state, at the time of the initial setting (step S11), and monitors whether the FLAG with respect to the purge valves 14, 15 is 0 or 1, as waiting for interrupt (step S12). While the purge valves 14, 15 are FLAG=0 (that is, while the control valve 5 is FLAG=0), the standby state is maintained, and when the purge valves 14, 15 become FLAG=1, FLAG=0 is given so as to cause the valve unit (next valve unit) 2 to be in an operating state (step S13). Thus, the valve unit controller 3a of the next valve unit 2 performs, with respect to the corresponding control valve 5, step S1 through step S10. The inter-valve-unit controller 3b issues a warning and a replacement notification that the valve unit 2 in the operating state has been replaced (step S14), and further gives FLAG=2 signifying that the valve unit 2 that had been in the operating state is in an inoperable state, to the valve unit 2 (step S15).

The control unit 3 not only performs the above-described control, but also monitors the past trouble history, and the like.

Figure 4:
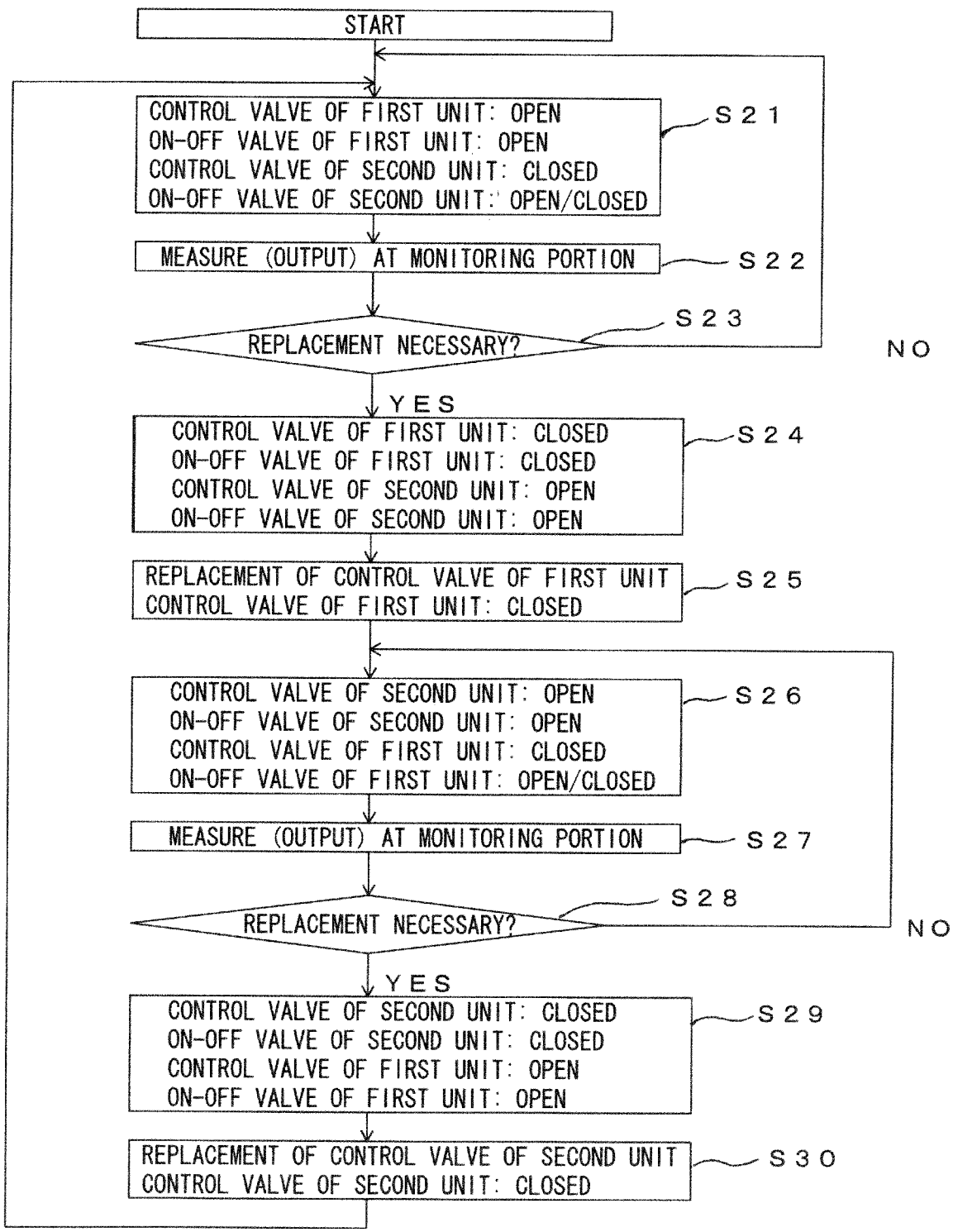
FIG. 4 is a flowchart showing a state of continuous use in a case where the flow rate control method in accordance with the present invention is applied to a flow rate control apparatus having two valve units.

FIG. 4 is a flowchart showing how an open state and a closed state of each of the valves 11, 12, 13, 14, 15 are switched in the continuous use in a case where the number of the valve units 2 is two (a first unit and a second unit).

First, in an initial state, the control valve 5 of the first unit is open and the on-off valves 12, 13 of the first unit are open, and the control valve 5 of the second unit is closed. The on-off valves 12, 13 of the second unit may be either open or closed (step S21).

The state of the control valve 5 of the first unit that performs flow rate control is monitored (measured and outputted) by the monitoring portion 5a (step S22). Whether or not replacement of the control valve 5 is necessary is determined from a signal outputted from the monitoring portion 5a (step S23).

In step S23, in the case where the replacement is necessary, each of the following valves is switched as described below: the control valve 5 of the first unit is closed; the on-off valves 12, 13 of the first unit are closed; the control valve 5 of the second unit is opened; and the on-off valves 12, 13 of the second unit are opened (step S24). When the replacement is not necessary, the process returns to step S21.

After step S24, the control valve 5 of the first unit is replaced with a new one, and then, is closed (step S25).

When the control valve 5 of the first unit is to be replaced, while the closed state of the on-off valves 12, 13 is maintained, the control valve 5 is opened, the purge valves 14, 15 are opened to conduct a purge, then the purge valves 14, 15 are closed, and the control valve 5 is replaced. Further, the control valve 5 is opened, and the purge valves 14, 15 are opened to conduct a purge once again. Then, the purge valves 14, 15 are closed and the control valve 5 is closed, whereby the replacement is completed. Replacement of the control valve 5 of the first unit may be performed, before the control valve 5 of the second unit requires replacement.

In step S24, the control valve 5 of the second unit is open and the on-off valves 12, 13 of the second unit are open, where the control valve 5 of the second unit is in a state of performing flow rate control. The control valve 5 of the first unit is closed, and the on-off valves 12, 13 of the first unit may be either open or closed (step S26).

In step S26, one that is performing flow rate control is the control valve 5 of the second unit, and the state of the control valve 5 of the second unit is monitored (measured and outputted) by the monitoring portion 5a (step S27). Then, whether or not replacement of the control valve 5 is necessary is determined from a signal outputted from the monitoring portion 5a (step S28).

In step S28, in a case where the replacement is necessary, each of the following valves is switched as described below: the control valve 5 of the second unit is closed; the on-off valves 12, 13 of the second unit are closed; the control valve 5 of the first unit is opened; and the on-off valves 12, 13 of the first unit are opened (step S29). When the replacement is not necessary, the process returns to step S26.

After step S29, the control valve 5 of the second unit is replaced with a new one, and then, is closed (step S30). Replacement of the control valve 5 of the second unit may be performed in the same manner as that of the control valve 5 of the first unit. In addition, replacement of the control valve 5 of the second unit may be performed before the control valve 5 of the first unit requires replacement.

In step S29, the control valve 5 of the first unit is opened and the on-off valves 12, 13 of the first unit are opened, whereby the state become the same as that in step S21. Thereafter, by repeating the steps from step 21 through step S29, the control valve 5 is replaced before the breakdown, which enables the flow rate control apparatus 1 to be used continuously.

Figure 5:
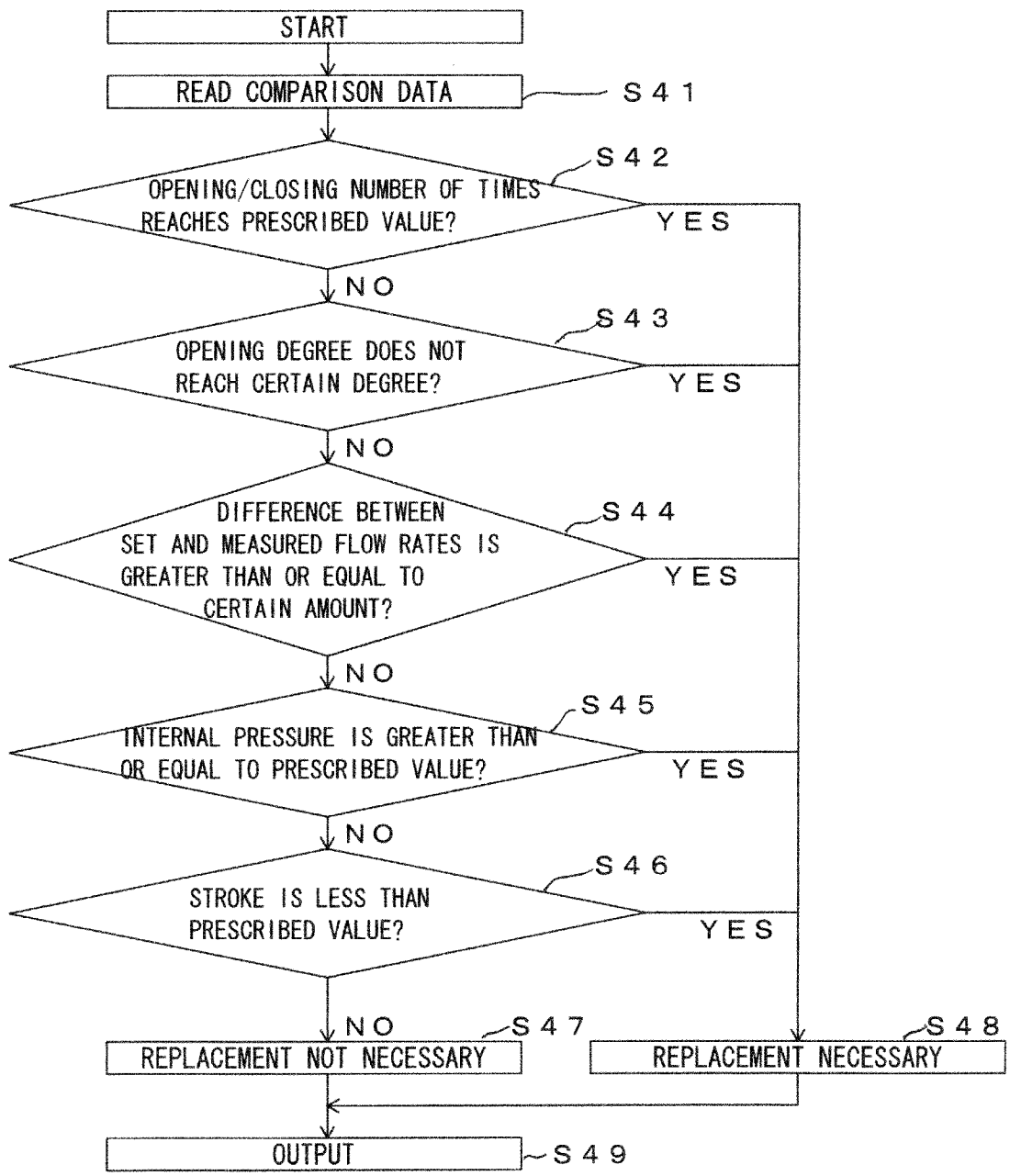
FIG. 5 is a flowchart showing a process of determination of replacement in the flow rate control apparatus and the flow rate control method for the flow rate control apparatus in accordance with the present invention.

FIG. 5 is a flowchart showing a process of determination of the replacement in the flow rate control method for the flow rate control apparatus.

In determining whether or not the replacement is necessary, first, comparison data are read (step S41). Then, whether or not the opening/closing number of times exceeds a prescribed value is determined (step S42). When the number of times exceeds the prescribed value, it is determined that replacement is necessary (step S48), and the determination to that effect is outputted (step S49).

Next, whether or not the opening degree exceeds a certain opening degree is determined (step S43). When the opening degree does not reach the certain opening degree, it is determined that replacement is necessary (step S48), and the determination to that effect is outputted (step S49).

Then, whether or not the difference between a set flow rate and a measured flow rate is greater than or equal to a certain amount is determined (step S44). When the difference is greater than or equal to the certain amount, it is determined that replacement is necessary (step S48), and the determination to that effect is outputted (step S49).

Next, whether or not an internal pressure is greater than or equal to a prescribed value is determined (step S45). When the internal pressure is greater than or equal to the prescribed value, it is determined that replacement is necessary (step S48), and the determination to that effect is outputted (step S49).

Thereafter, whether or not a stroke is less than a prescribed value is determined (step S46). When the stroke is less than the prescribed value, it is determined that replacement is necessary (step S48), and the determination to that effect is outputted (step S49).

The determination steps from step S42 through step S46 may be performed in any order. When results of all the determination steps from step S42 through step S46 turn out to be NO (available), it is determined that replacement is not necessary (step S47), and the determination to that effect is outputted (step S49).

As described above, with the flow rate control apparatus 1, while any one of a plurality of valve units 2 arranged in parallel is caused to be in an operating state, the operating state is monitored, and when there arises a need to replace a control valve 5 in the operating valve unit 2, another valve unit 2 that has been in a standby state is immediately caused to be in an operating state. Therefore, equipment that performs continuous production using the flow rate control apparatus 1 does not allow the occurrence of trouble caused by a breakdown of the control valve 5. In addition, notification is given from the control valve 5, the operation of which has been interrupted, to the control unit 3 so as to conduct a purge within the corresponding valve unit 2 automatically, and the control valve 5 is replaced to be shifted into a standby state, which enables the valve operation to be continued semipermanently.

INDUSTRIAL APPLICABILITY

It becomes possible to continuously use the flow rate control apparatus that is to be used in equipment, such as semiconductor manufacturing equipment, which operates continuously. Therefore, the present invention can provide an advantage that equipment using the flow rate control apparatus can continue its operation without being affected by the abnormality of the control valve.

The invention claimed is:
1. A flow rate control apparatus comprising:
one flow passage;
branch portions at which the flow passage branches into a plurality of branch passages;
control valves disposed in the respective branch passages into which the flow passage branches at the branch portions; and
a monitoring portion configured to monitor a state of a corresponding one of the control valves, wherein
each branch passage consists of the same components including the control valve, the same components comprise an on-off valve disposed at an upstream side of the control valve and an on-off valve disposed at a downstream side of the control valve, and one control valve is in an operating state and the other control valves are in a standby state, and
a flow rate of a fluid is controlled via the one control valve in the operating state, and
when replacement of the one control valve in the operating state is determined to be necessary on a basis of a signal outputted from the monitoring portion of the one control valve in the operating state,
the one control valve in the operating state, which is performing flow rate control, is closed, and one of the other control valves in the standby state, is opened, and
on-off valves disposed at an upstream side and a downstream side of the one control valve in the operating state are closed so as to perform flow rate control such that the flow rate is equivalent to that before the replacement.

2. The flow rate control apparatus according to claim 1, further comprising a control unit, wherein
the control unit
receives an output from the monitoring portion, and
determines whether or not the replacement is necessary from the signal outputted from the monitoring portion.

3. The flow rate control apparatus according to claim 2, wherein
the control unit compares the signal outputted from the monitoring portion and previously stored data, and determines that the replacement is necessary when the signal exceeds a predetermined value or exceeds a predetermined number of opening/closing times.

4. The flow rate control apparatus according to claim 3, wherein
each of the control valves is equipped with an adjustment portion capable of performing fine flow rate control by making fine adjustment of its opening degree.

5. The flow rate control apparatus according to claim 2, wherein
each of the control valves is equipped with an adjustment portion capable of performing fine flow rate control by making fine adjustment of its opening degree.

6. The flow rate control apparatus according to claim 1, wherein
each of the control valves is equipped with an adjustment portion capable of performing fine flow rate control by making fine adjustment of its opening degree.

7. The flow rate control apparatus according to claim 1, wherein
the monitoring portion comprises: a valve opening-degree measurement sensor or a flow rate sensor; an opening/closing number of times measurement sensor; a proximity sensor, a displacement sensor, a flow rate sensor or a pressure sensor each configured to detect movement of a stem of the control valve; and the like.

8. A flow rate control apparatus comprising:
one flow passage;

branch portions at which the flow passage branches into a plurality of branch passages;

control valves disposed in the respective branch passages into which the flow passage branches at the branch portions; and a monitoring portion configured to monitor a state of a corresponding one of the control valves, wherein a flow rate of a fluid is controlled via any one of the control valves disposed in the respective branch passages, and when replacement of the one control valve is determined to be necessary on a basis of a signal outputted from the monitoring portion of the one control valve, the one control valve, which is performing flow rate control, is closed, and another one of the control valves, which is disposed in another one of the branch passages, is opened, so as to perform flow rate control such that the flow rate is equivalent to that before the replacement, and on-off valves disposed at an upstream side and a downstream side of the closed control valve are also closed, wherein a purge line and a purge valve in the purge line are disposed between each of the control valves and the corresponding on-off valve disposed at the upstream side, and another purge line and another purge valve in the another purge line are disposed between the control valve and the corresponding on-off valve disposed at the downstream side.

9. A flow rate control method for a flow rate control apparatus, the flow rate control apparatus comprising, one flow passage, branch portions at which the flow passage branches into a plurality of branch passages, control valves disposed in the respective branch passages into which the flow passage branches at the branch portions, and a monitoring portion configured to monitor a state of a corresponding one of the control valves, each branch passage consists of the same components including the control valve, the same components comprise an on-off valve disposed at an upstream side of the control valve and an on-off valve disposed at a downstream side of the control valve, and the flow rate control method comprising:

a step A of monitoring a state of any one of the control valves, which is performing flow rate control, by the corresponding monitoring portion;

a step B of determining whether or not valve replacement is necessary from a signal outputted from the monitoring portion;

a step C of, in a case where the replacement is determined to be necessary in the step B, closing the one control valve that is performing flow rate control, and opening another one of the control valves, which is disposed at another one of the branch passages, so as to start flow rate control such that the flow rate is equivalent to that before the replacement; and a step D of closing on-off valves disposed at an upstream side and a downstream side of the closed control valve.

10. The flow rate control method according to claim 9, wherein each of the control valves is equipped with an adjustment portion configured to make fine adjustment of opening/closing movements of the control valve, and the step C includes a step of performing adjustment of the opening/closing movements, by the adjustment portion, so as to eliminate a difference between the another control valve that has started flow rate adjustment and the one control valve that is closed, and eliminate an individual difference between branch passages.

* * * * *